Oct. 10, 1950    R. H. FOX    2,524,904
ELECTRICAL MEASURING DEVICE
Filed Jan. 17, 1946

INVENTOR
Roy H. Fox
BY
ATTORNEY

Patented Oct. 10, 1950

2,524,904

UNITED STATES PATENT OFFICE 2,524,904

ELECTRICAL MEASURING DEVICE

Roy H. Fox, Camden, N. J., assignor to Radio Corporation of America, a corporation of Delaware Application January 17, 1946, Serial No. 641,845

4 Claims. (Cl. 250—27)

This invention relates to electrical measuring devices such as are useful for measuring the peak power of a radio frequency circuit wherein the power to be measured is in the form of pulses which are of short duration and are separated from one another by relatively long time intervals.

The pulse rate of a modern radar transmitter, for example, is approximately 400 cycles per second and the pulse width is one microsecond or less. Heretofore, the peak power output of such a periodically pulsed equipment has been measured by means of a diode connected in series with a resistor and a voltmeter which are shunted by a capacitor. This involves circuit constants such as to make the diode circuit behave like a peak voltmeter so that the meter provides an indication of $E^2/R$ where E is the peak voltage and R is the load resistance.

If the diode circuit is to behave as a true peak reading meter, a change in pulse width must not produce any change in the meter reading. For pulses of long duration, this can be accomplished but as the pulses become shorter in duration, it becomes increasingly difficult to maintain the peak value because of the large values required in the cathode circuit of the diode and the inability to provide the required time constant. This is especially true in the case of the modern radar transmitter where the pulse duration is usually one five-thousandth of the pulse repetition rate or less.

In accordance with the present invention, this difficulty is avoided by the provision of an improved peak power measuring device wherein the measured pulses are so modified as to have the same width. To this end, the pulses are rectified and applied to the meter through an amplifier which is biased on only for a predetermined time interval in response to each pulse. The various elements involved are (1) a diode for rectifying the radio frequency pulse, (2) a gated amplifier for amplifying the rectified pulse, (3) a gate forming circuit for limiting the period during which the amplifier is biased on, and (4) a diode voltmeter which may be calibrated to read in terms of the peak power output. The gated amplifier is normally biased to cut off and amplifies only when a positive pulse is applied to its control grid. The gate forming circuit functions to present a constant gate width to the amplifier. The voltmeter measures a voltage proportional to the peak voltage of the pulse for a constant gate width. A resistance-capacity circuit in the cathode lead of the amplifier is so adjusted as to allow the amplifier to return to its cut off condition before the next pulse appears.

Important objects of the invention are the provision of an improved peak power measuring device, the provision of a peak power measuring device which is unaffected by variation in pulse width, and the provision of a measuring device which is adapted to measure the peak power of very short pulses.

The invention will be better understood from the following description considered in connection with the accompanying drawings and its scope is indicated by the appended claims.

Referring to the drawings.

Figure 1:
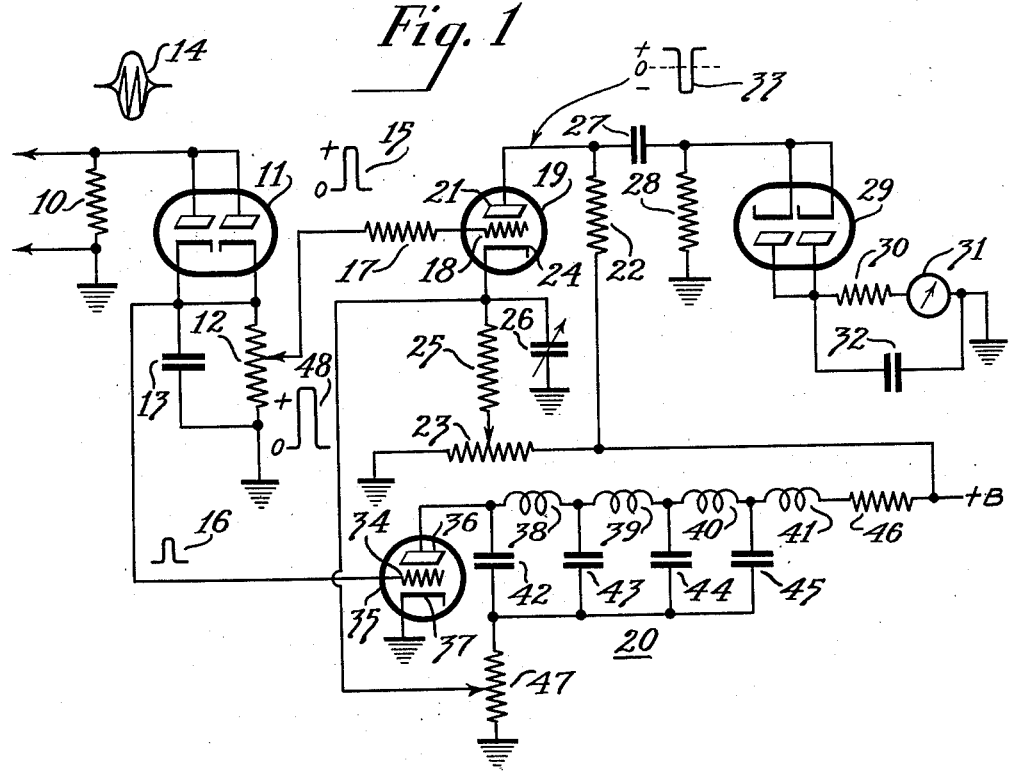
Fig. 1 is a wiring diagram of the improved peak power measuring device.

The circuit of Fig. 1 includes a load resistor 10 across which are connected a diode 11 and a resistor 12 which is shunted by a capacitor 13. The type of modulated high frequency pulse applied from the load resistor 10 to the anodes of the diode 11 is indicated by the reference numeral 14 and the pulse delivered from the diode 11 and its associated circuit 12—13 is indicated by the reference numerals 15 and 16.

The pulse 15 is applied through a resistor 17 to the control grid 18 of an amplifier 19 which is normally biased off as hereinafter explained. Operating potential is applied to the anode 21 of the amplifier 19 from a +B lead through a resistor 22. Connected between the bottom terminal of the resistor 22 and ground is a potentiometer 23 which has its adjustable contact connected to the cathode 24 of the amplifier 19 through a resistor 25. The resistor 25 and the left hand section of the resistor 23 are shunted by a capacitor 26. As previously indicated the values of the capacitor 26 and the resistors 23 and 25 are so related that the amplifier 19 is deenergized or biased off, by the voltage across the left hand side of the resistor 23, between the successive pulses delivered from the load resistor 10.

Through a capacitor 27, the output circuit of the amplifier 19 is coupled to a parallel circuit one leg of which consists of a resistor 28 and the other leg of which includes (1) a diode 29 and (2) a resistor 30 and a meter 31 which are shunted by a capacitor 32. The type of pulse delivered through the coupling capacitor 27 to the diode 29 is indicated by the reference numeral 33. The meter 31 preferably is calibrated to indicate the peak power of the pulse 33.

From the cathodes of the diode 11, the pulse 16 is applied to the control grid 34 of a gaseous electron discharge tube 35 which includes an anode 36 and a grounded cathode 37. Potential is applied to the anode 36 from a time delay network which (1) includes series reactors 38 to 41 and shunt capacitors 42 to 45, (2) is connected to the +B terminal through a resistor 46, and (3) is connected to ground through a potentiometer 47. The adjustable contact of the potentiometer 47 is connected to the cathode 24 of the amplifier 19, and the character of the pulse delivered from the potentiometer 47 to the cathode 24 is indicated by the reference numeral 48. This pulse 48 is of positive polarity for the reason that the upper terminal of the resistor 47 becomes more positive as the capacitors 42 to 45 are discharged.

During the time intervals between the appearance of pulses at the load resistor 10, the amplifier 19 is deenergized due to the fact that there is little or no current in the resistor 12 and the amplifier control grid 18 is near ground potential. When the pulse 15 appears, a positive potential is applied to the grid 18 and the amplifier conducts current. At the same time, the pulse 16 is applied to the grid 34 of the tube 35 through which the network 20 starts to discharge its stored energy. As this stored energy is discharged through the tube 35 and the potentiometer 47, the potential of the cathode 24 is made more positive so that the current conductivity of the amplifier is terminated at a predetermined time interval after the beginning of the pulse 15. This time interval is, of course, determined by the constants of the network 38 to 41 and 42 to 45 and is made such that all the pulses 33 are of the same width irrespective of the widths of the pulses 15. Under these conditions, the peak power of the pulses 33 is indicated correctly by the meter 31.

During the interval following the pulse 16, the grid 34 is at substantially ground potential, the tube 35 ceases to conduct, and energy is stored in the network 38 to 41 and 42 to 45 by current delivered from the +B terminal through the resistors 46 and 47. The transmission of this current through the potentiometer 47, however, has no effect on the non-conductive state of the amplifier 19 for the reason that its control grid 18 is now at ground potential due to the absence of current in the diode 11.

Figure 2:
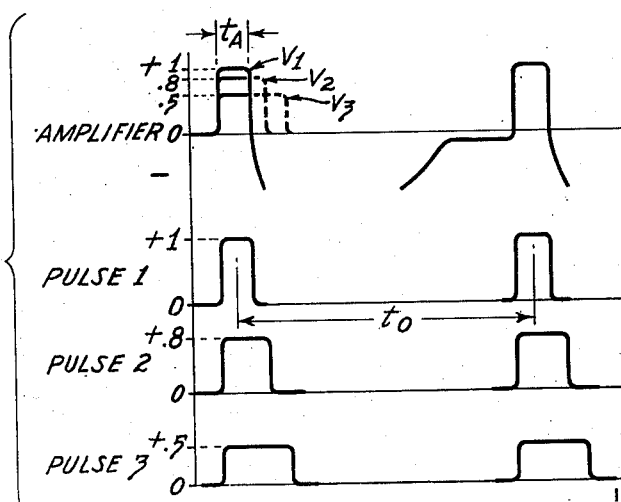
Fig. 2 is a set of explanatory curves relating to the device of Fig. 1.

The curves of Fig. 2 are for the most part readily understood from the appended legends wherein $t_0$=the repetition rate of the pulses, $t_A$=the time of the amplifier gate, $V_1$ is the voltage of "pulse 1" as read by the meter 31, $V_2$ is the voltage of "pulse 2" as read by the meter 31 and $V_3$ is the voltage of "pulse 3" as read by the meter 31. It is apparent that the meter 31 indicates an amplitude proportional to the pulse height or amplitude regardless of variation of the pulse width from its normal value.

Thus what the present invention provides is an improved device which functions to measure and indicate the peak power of a series of pulses correctly in spite of variation in the width of such pulses.

I claim as my invention:

1. The combination of means for rectifying a pulse repeated at a predetermined time interval, an amplifier having a cathode and anode and a grid, a time delay element including an electron discharge element having a cathode and an anode and a grid, means for storing energy in said delay element, means for applying said rectified pulse to said grids, and means interconnecting said delay element and the cathode of said amplifier for limiting the current conductivity of said amplifier to a time interval determined by the discharge of said stored energy through said electron discharge element.

2. The combination of pulse rectifying means, an amplifier having a cathode and anode and a control grid, time delay means including an electric discharge element having a cathode and anode and a control grid, means for storing energy in said time delay means, means for applying rectified pulses from said pulse rectifying means to said grids, means for biasing off said amplifier during the time interval between said rectified pulses, and means interconnecting said delay means and the cathode of said amplifier for biasing on said amplifier for a predetermined time interval beginning with each of said rectified pulses and determined by the discharge of said stored energy through said electron discharge element.

3. The combination of a rectifier means including a potentiometer connected in the cathode lead of said rectifier and having a movable contact, an amplifier having a cathode and anode and having a control grid connected to said movable contact, time delay means including an electron discharge element having a cathode and anode and having a control grid connected to the cathode of said rectifier, means for storing energy in said time delay means, and means interconnecting said delay means and the cathode of said amplifier for limiting the conductivity of said amplifier to a time interval determined by the discharge of said stored energy through said electron discharge element.

4. The combination of a rectifier means including a potentiometer connected in the cathode lead of said rectifier and having a movable contact, an amplifier having a cathode and anode and having a control grid connected to said movable contact, time delay means including an electron discharge element having a cathode and anode and having a control grid connected to the cathode of said rectifier, means for storing energy in said time delay means, and means including an adjustable resistor interconnecting said delay means and the cathode of said amplifier for limiting the conductivity of said amplifier to a time interval determined by the discharge of said stored energy through said electron discharge element.

ROY H. FOX.

REFERENCES CITED

The following references are of record in the file of this patent:

UNITED STATES PATENTS

| Number | Name | Date |
|---|---|---|
| 2,266,154 | Blumlein | Dec. 16, 1941 |
| 2,415,855 | Skellet | Feb. 19, 1947 |
| 2,419,607 | Terry et al. | Apr. 29, 1947 |